April 27, 1948.  M. J. KRALL  2,440,587
CURB GUIDING SIGNAL
Filed June 28, 1943  4 Sheets-Sheet 1
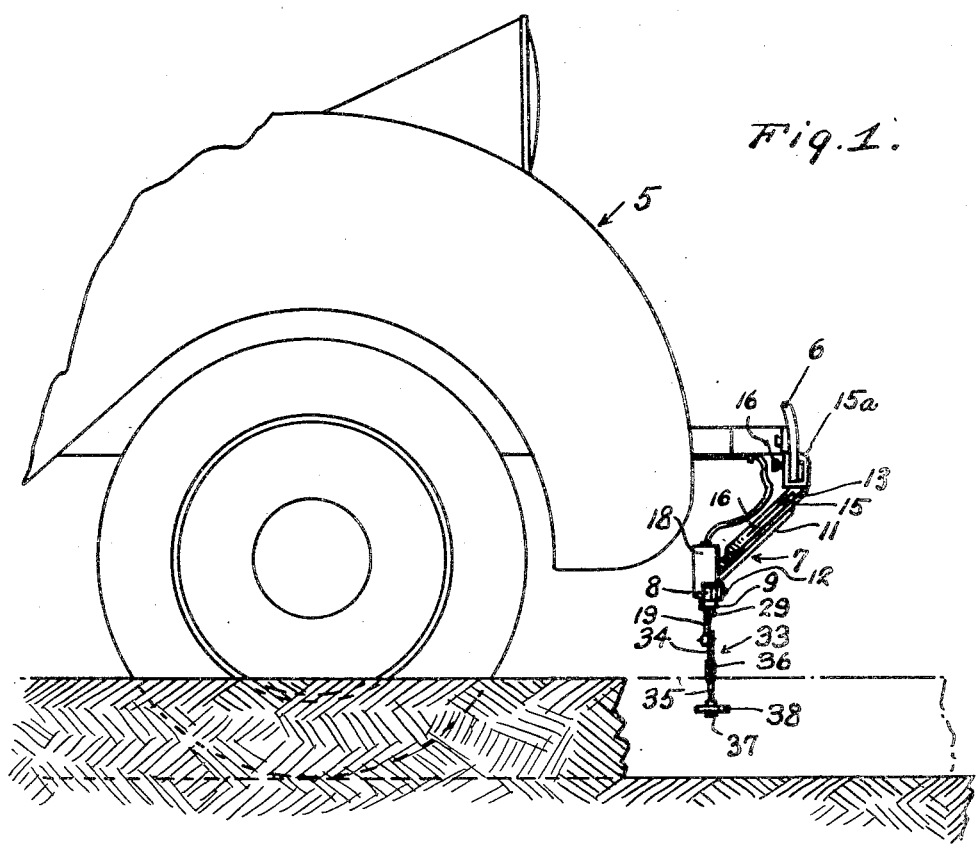
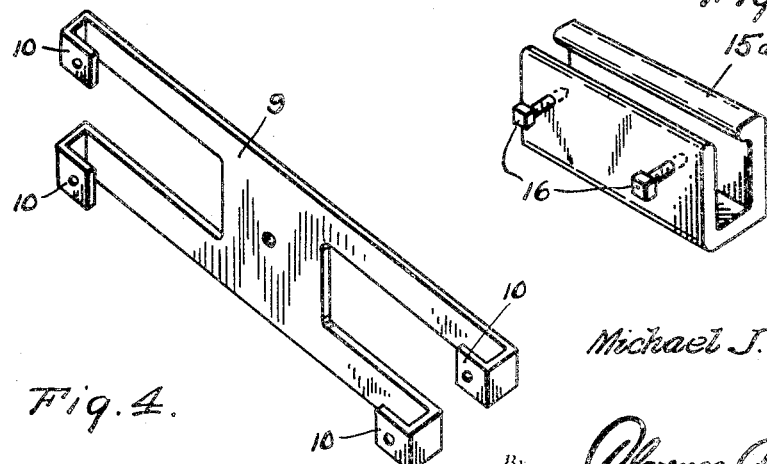
Inventor
Michael J. Krall

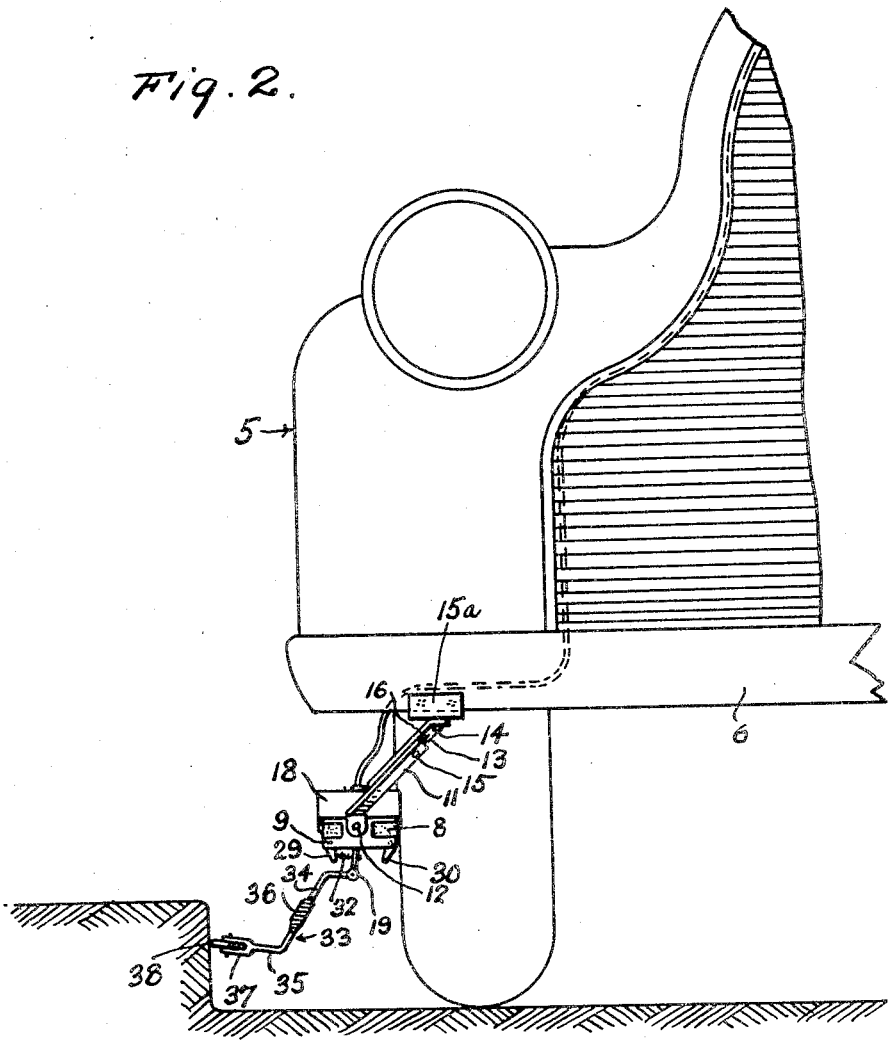
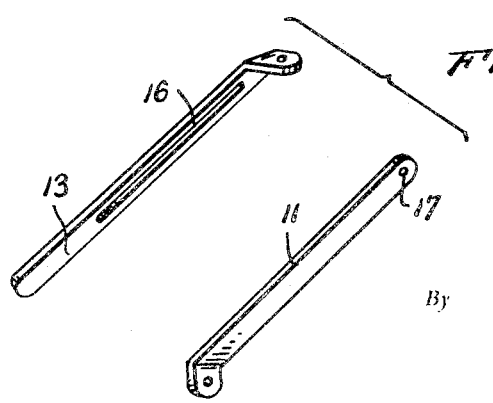

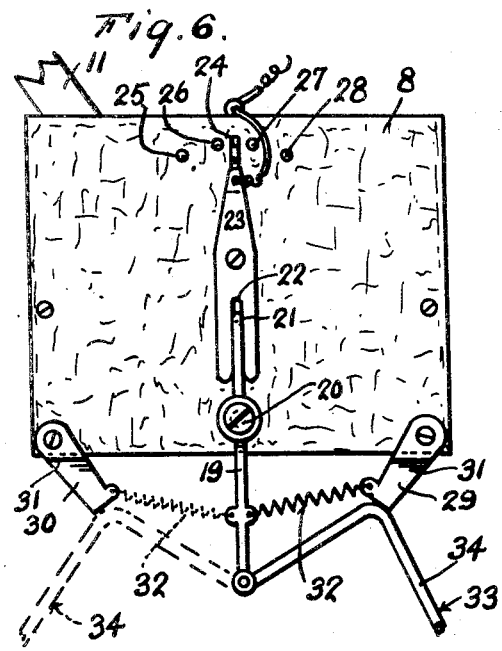
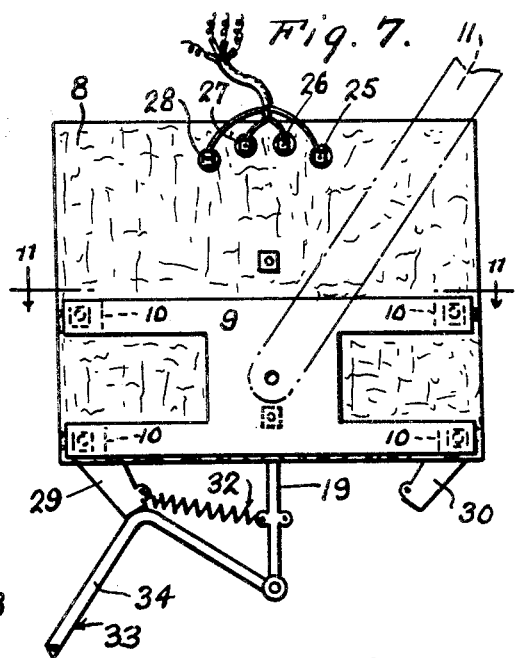
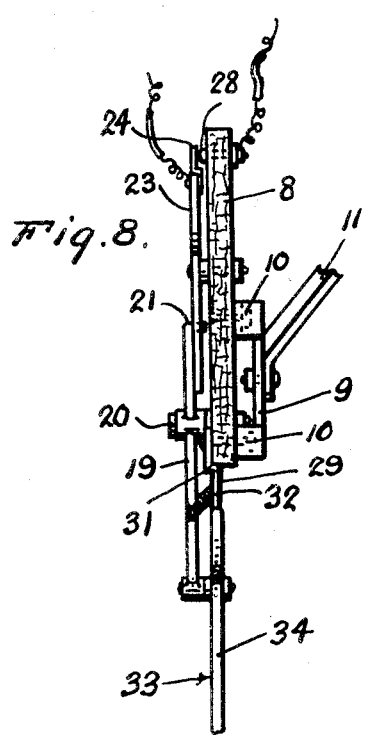
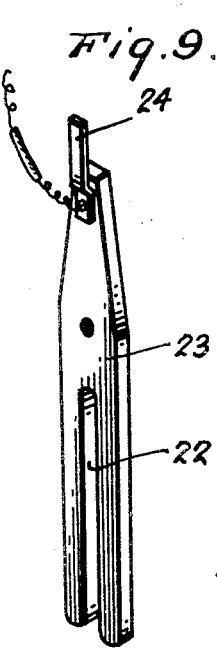
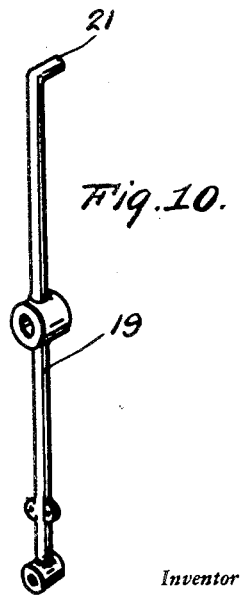

April 27, 1948. M. J. KRALL 2,440,587
CURB GUIDING SIGNAL
Filed June 28, 1943 4 Sheets-Sheet 4
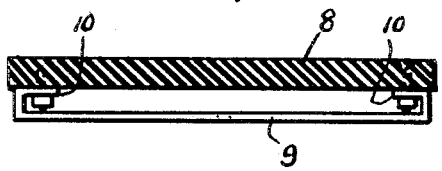
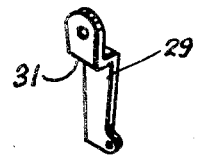
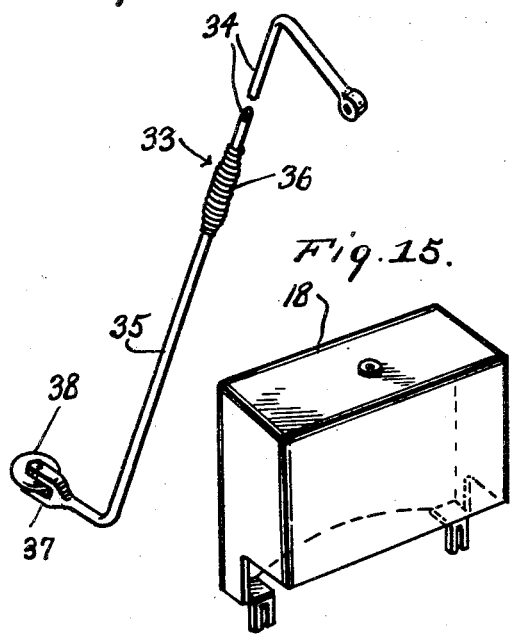
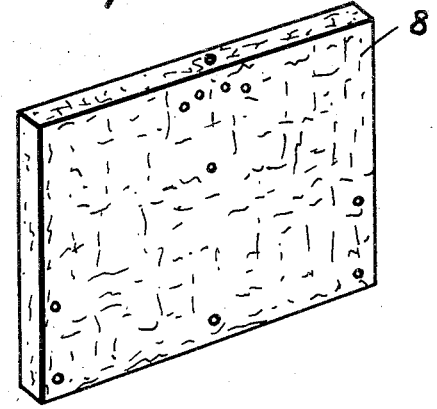
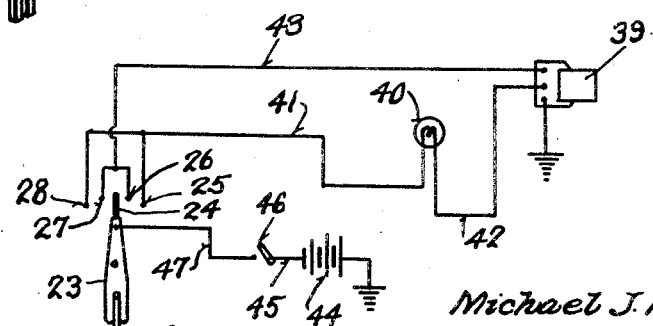
Inventor
Michael J. Krall
By Clarence A. O'Brien
and Harvey B. Jacobson
Attorneys Patented Apr. 27, 1948

2,440,587

UNITED STATES PATENT OFFICE 2,440,587

CURB GUIDING SIGNAL

Michael J. Krall, Newark, N. J.

Application June 28, 1943, Serial No. 492,597

2 Claims. (Cl. 200—52)

This invention relates to new and useful improvements in electrical indicators, the principal object being to provide an indicator to assist in guiding an automobile driver in parking adjacent a street curb.

Another important object of the invention is to provide a street curb guide which will automatically indicate to the driver his position with respect to the curb in order that the driver may execute a quick and proper parking of his car on city streets.

Other objects and advantages of the invention will become apparent to the reader of the following description.

In the drawings:

Figure 1 represents a fragmentary side elevational view of the front portion of an automobile showing the switch means mounted for use.

Figure 2 is a fragmentary front elevational view showing the switch mounted for use.

Figure 3 is a perspective exploded view showing the bracket for the switch means.

Figure 4 is a perspective view of the frame of the switch.

Figure 5 is a perspective view of the bumper clamp.

Figure 6 is an elevational view looking at the rear side of the switch structure.

Figure 7 is a fragmentary front elevational view of the switch structure.

Figure 8 is an edge elevational view of the switch structure.

Figure 9 is a perspective view of the contactor arm of the switch.

Figure 10 is a perspective view of the rocker element of the switch.

Figure 11 is a transverse sectional view taken on the line 11—11 of Figure 7.

Figure 12 is a perspective view of one of the stops.

Figure 13 is a perspective view of the roller equipped feeler.

Figure 14 is a perspective view of the panel of insulation.

Figure 15 is a perspective view of the shell.

Figure 16 is a diagrammatic view showing the electrical connections between the electrical elements involved.

Referring to the drawings wherein like numerals designate like parts, it can be seen that numeral 5 generally refers to a conventional automobile having a front bumper 6. Numeral 7 generally refers to the switch mechanism of the electrical indicator, this being mounted at the right end of the bumper.

The switch mechanism includes a panel 8 (see Figure 14) of insulation and to the front side of this is secured a frame 9 which is in the form of a horizontally disposed H having backwardly disposed end portions 10 which when secured to the panel 8 serve to space the main body of the frame 9 from the panel.

A two part brace is employed for supporting the switch proper, this consisting of an arm 11 which has its lower end secured as at 12 to the frame 9 and a section 13 which has its upper end secured as at 14 to the underside of the channeled clamp 15ª, this clamp being provided with set screws 16 whereby the clamp is secured to a bumper 6 as shown in Figure 2.

Numeral 15 denotes a bolt which is equipped with a nut, this being disposed through a slot 16 in the brace section 13 and through an opening 17 in the upper end of the section 11, thus the sections can be adjusted one with respect to the other.

A protecting shell 18 is provided for the upper portion of the panel 8, where the contacting elements are located.

On the rear side of the panel 8 a rocked 19 is provided and fulcrumed on a stud 20 projecting from the panel 8. The upper end of the rocker 19 has an inwardly disposed pintle 21 which projects into a slot 22 located in the lower portion of a rockable contactor arm 23, this upper end of which carries a contact 24. The contactor arm 23 may be of insulation.

The contact 24 shown in Figure 6 is illustrated in normal position between the contacts 25, 26 at one side thereof and contacts 27, 28 at the opposite side thereof, these contacts being located on the panel 8.

Stop dogs 29, 30 are provided on the lower corners of the panel 8 and each has an offset shoulder 31 adapted to abut the under edge of the panel to prevent any looseness of the stop dogs.

Between either one side portion or the other of the rocker 19 and the corresponding stop dog 29 or 30, a tension spring 32 is provided. To use the switch for either a right or a left curb the corresponding change in the position of the spring is made.

Numeral 33 denotes a feeler which consists of an elongated arm divided into sections 34, 35 connected by a strong spring 36. The arm is substantially in the form of an S as shown in Figure 13 and is bifurcated at its lower end as at 37 to permit mounting of a curb engageable roller 38. The feeler 33 is positively connected to the rocker 19 so that operation of the feeler will turn the rocker 19 and result in operation of the contactor arm 23.

As shown in Figure 16, the electrical system includes a buzzer 39 and a warning signal 40 indicating danger. Connections are made from the contacts 25, 28 to a conductor 41 which extends to the signal 40. A jumper 42 extends to the buzzer 39 and one side of which is grounded. A conductor 43 extends from the contacts 26, 27 to the buzzer 39. A source of current 44 has a lead 45 to a switch 46 and from the switch 46 a conductor 47 extends to the contact 24 on the contactor arm 23.

It can now be seen, that when the feeler 33 initially engages a curb and is slightly moved, the contactor arm 23 will engage the corresponding contacts 26, 27 and this will energize the buzzer 39 so that an audible signal is given. If the driver further presses on the feeler 33 by coming too close to the curb, the contact element 24 will be brought to engage either the contact 25 or the contact 28 and this will result in current passing from the battery 44 through the switch mechanism to the conductor 41, energizing the danger indicating signal 40 besides the buzzer 39. This dual warning indicates to the driver that he is dangerously close to the curb.

It can be appreciated, that with white wall tires and in fact, any tires, this device will serve to protect the walls thereof against damage due to rubbing against curbs while parking.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A signal switch mechanism for curb location indicators of vehicles, carried by a part projecting from said vehicle and including a curb feeler adapted to come into contact with the curb which comprises a panel attached to said part projecting from the vehicle, a contactor member pivotally attached to said panel, contacts on said panel cooperating with said contactor, a driving member for said contactor consisting of a two armed lever pivotally mounted on said panel, a pivot pin carrying said driving member, means on said contactor and on one arm of said two armed driving member, for rotating the contactor, around its pivotal connection, when the driving member is rocked around its pivot, and further means for fixedly attaching the said curb feeler to the second arm depending from said driving member, for transmitting the movement of the curb feeler to the said driving member.

2. A signal switch mechanism for curb location indicators of vehicles carried by a part projecting from said vehicle and including a curb feeler, comprising a panel attached to said projecting part, a contactor member and contacts mounted on said panel, said contactor member being pivotally mounted on said panel and provided with a guide slot, a driving member for said contactor pivotally mounted on said panel below the said contactor, and a pivot pin for holding the same, an operative member projecting from said driving member and engaging the guiding slot of said contactor, for moving the same around its pivot, an arm depending from said driving member, a spring acting on said arm, and frictional means for rigidly attaching the aforesaid feeler to the projecting arm for carrying the latter and for translating the inward movement of the feeler into an arcuate movement of the arm around the said pivot.

MICHAEL J. KRALL.

REFERENCES CITED

The following references are of record in the file of this patent:

UNITED STATES PATENTS

| Number | Name | Date |
|---|---|---|
| 1,293,532 | Peck | Feb. 4, 1919 |
| 1,363,658 | Krantz | Dec. 28, 1920 |
| 1,393,968 | Rischel | Oct. 18, 1921 |
| 1,709,400 | Hess | Apr. 16, 1929 |
| 1,925,612 | Snell | Sept. 5, 1933 |
| 2,302,283 | Yarnall | Nov. 17, 1942 |

FOREIGN PATENTS

| Number | Country | Date |
|---|---|---|
| 494,424 | Great Britain | Oct. 26, 1938 |
| 742,482 | France | Dec. 27, 1932 |